US010296391B2

(12) United States Patent
Justice et al.

(10) Patent No.: US 10,296,391 B2
(45) Date of Patent: May 21, 2019

(54) ASSIGNING A PLAYER TO A MACHINE

(71) Applicant: Microsoft Corporation, Redmond, WA (US)

(72) Inventors: John Raymond Justice, Bellevue, WA (US); Dave Lalor, Redmond, WA (US); Stefan Keir Gordon, Redmond, WA (US); Joshua Boehm, Seattle, WA (US); Stephen John Butler, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 569 days.

(21) Appl. No.: 14/319,752

(22) Filed: Jun. 30, 2014

(65) Prior Publication Data
US 2015/0375113 A1 Dec. 31, 2015

(51) Int. Cl.
*G06F 9/50* (2006.01)
*A63F 13/355* (2014.01)
(Continued)

(52) U.S. Cl.
CPC .......... *G06F 9/5027* (2013.01); *A63F 13/355* (2014.09); *A63F 13/77* (2014.09);
(Continued)

(58) Field of Classification Search
CPC ...... A63F 13/35; A63F 13/352; A63F 13/355; A63F 13/70; A63F 13/77; A63F 13/79;
(Continued)

(56) References Cited

U.S. PATENT DOCUMENTS

| 5,459,837 A * | 10/1995 | Caccavale | ............... | G06F 9/505 |
| | | | | 702/182 |
| 6,903,681 B2 * | 6/2005 | Faris | ...................... | A63F 13/12 |
| | | | | 342/357.4 |

(Continued)

OTHER PUBLICATIONS

Lee et al., "Adaptive server selection for large scale interactive online games", Computer Networks, vol. 49, No. 1, Sep. 2005, pp. 84-102.*

(Continued)

*Primary Examiner* — Hua Fan
*Assistant Examiner* — William C McBeth
(74) *Attorney, Agent, or Firm* — Shook, Hardy & Bacon L.L.P.

(57) ABSTRACT

Systems and methods are provided for optimizing allocation of client devices, such as gaming devices, to different available data centers and servers, such as gaming servers, within a data center. The allocation maintains a satisfactory user experience while balancing costs and resource usage. Embodiments of the invention match a client to a data center and server based on a set of criteria related to the client device, user of the client device, game or application the user desires to play, available data centers for supporting the client device, and conditions of the network between the client device and data center. An allocation algorithm may be used to determine resource-efficient allocation. In one embodiment, a bidding process is employed wherein a client and data center are matched based on bids received from data centers. In one embodiment, allocation is periodically evaluated to determine if reassignment to another data center is needed.

20 Claims, 9 Drawing Sheets

(51) Int. Cl.
  *A63F 13/79*  (2014.01)
  *A63F 13/95*  (2014.01)
  *A63F 13/77*  (2014.01)
  *H04L 29/08*  (2006.01)
  *A63F 13/352* (2014.01)

(52) U.S. Cl.
  CPC .............. *A63F 13/79* (2014.09); *A63F 13/95* (2014.09); *H04L 67/1004* (2013.01); *A63F 13/352* (2014.09); *G06F 9/5094* (2013.01); *G06F 2209/502* (2013.01); *H04L 67/1008* (2013.01); *H04L 67/1014* (2013.01); *H04L 67/1021* (2013.01); *H04L 67/1023* (2013.01); *Y02B 60/142* (2013.01)

(58) Field of Classification Search
  CPC ...... A63F 13/95; A63F 13/358; G06F 9/5005; G06F 9/5027; G06F 9/505; G06F 9/5055; G06F 9/5083; G06F 9/5088; G06F 9/5094; G06F 17/3225; G06F 2209/501; G06F 2209/5015; G06F 2209/5019; G06F 2209/502; G06F 2209/503; H04L 67/10; H04L 67/1002; H04L 67/1004; H04L 67/1008; H04L 67/101; H04L 67/1012; H04L 67/1014; H04L 67/1021; H04L 67/1023; Y02B 60/142
  See application file for complete search history.

(56) References Cited

U.S. PATENT DOCUMENTS

| | | | |
|---|---|---|---|
| 8,606,942 B2* | 12/2013 | Perlman | A63F 13/12 709/203 |
| 9,215,268 B1* | 12/2015 | Wood | H04L 67/322 |
| 9,342,559 B1* | 5/2016 | Jedrzejowicz | G06Q 30/016 |
| 2003/0115258 A1* | 6/2003 | Baumeister | H04L 29/06 709/203 |
| 2004/0009815 A1* | 1/2004 | Zotto | A63F 13/12 463/42 |
| 2004/0019659 A1* | 1/2004 | Sadot | H04L 67/1021 709/219 |
| 2004/0122926 A1* | 6/2004 | Moore | G06F 17/30864 709/223 |
| 2006/0206586 A1* | 9/2006 | Ling | H04L 67/1002 709/219 |
| 2006/0258463 A1* | 11/2006 | Cugno | A63F 13/12 463/42 |
| 2008/0071907 A1* | 3/2008 | Thompson | H04L 67/104 709/224 |
| 2008/0102851 A1* | 5/2008 | Bodnar | H04L 67/1002 455/452.2 |
| 2008/0215681 A1* | 9/2008 | Darcie | H04L 12/66 709/204 |
| 2009/0037367 A1* | 2/2009 | Wein | G06F 9/5061 |
| 2009/0204711 A1* | 8/2009 | Binyamin | H04L 67/1008 709/226 |
| 2010/0056275 A1* | 3/2010 | Wilson | A63F 13/12 463/32 |
| 2010/0115063 A1* | 5/2010 | Gladwin | H04L 67/1002 709/219 |
| 2010/0167809 A1* | 7/2010 | Perlman | A63F 13/12 463/24 |
| 2010/0223385 A1* | 9/2010 | Gulley | G06F 9/5027 709/226 |
| 2010/0228861 A1 | 9/2010 | Arsovski et al. | |
| 2011/0107358 A1* | 5/2011 | Shyam | G06F 9/5027 719/330 |
| 2011/0138053 A1* | 6/2011 | Khan | G06F 9/505 709/226 |
| 2011/0212783 A1 | 9/2011 | Dale et al. | |
| 2012/0066018 A1* | 3/2012 | Piersol | G06Q 10/10 705/7.14 |
| 2012/0137287 A1* | 5/2012 | Pang | G06F 9/5088 718/1 |
| 2012/0173729 A1* | 7/2012 | Lee | H04L 67/1012 709/226 |
| 2012/0284383 A1 | 11/2012 | Dudek et al. | |
| 2013/0019027 A1* | 1/2013 | Kazan | H04L 67/1095 709/240 |
| 2013/0035060 A1* | 2/2013 | Chan | H04L 12/145 455/406 |
| 2013/0073600 A1 | 3/2013 | Jenkins et al. | |
| 2013/0073716 A1 | 3/2013 | Dejana | |
| 2013/0080613 A1 | 3/2013 | Thireault | |
| 2013/0254261 A1 | 9/2013 | Nicholls | |
| 2013/0297770 A1* | 11/2013 | Zhang | G06F 9/505 709/224 |
| 2014/0136690 A1* | 5/2014 | Jain | H04L 67/322 709/224 |
| 2014/0269333 A1* | 9/2014 | Boerjesson | H04L 45/123 370/238 |
| 2014/0280963 A1* | 9/2014 | Burbridge | H04L 67/1021 709/226 |
| 2014/0330897 A1* | 11/2014 | Ma | H04L 67/327 709/203 |
| 2015/0038234 A1* | 2/2015 | Bojorquez | A63F 13/352 463/42 |
| 2015/0180748 A1* | 6/2015 | Ding | H04L 41/046 709/224 |
| 2016/0226966 A1* | 8/2016 | Lin | H04L 67/1021 |
| 2017/0024259 A1* | 1/2017 | Mecklin | G06F 9/5044 |

OTHER PUBLICATIONS

Hanna et al., "Evaluation of a Novel Two-Step Server Selection Metric", Ninth International Conference on Network Protocols, Nov. 2001, pp. 290-300.*
Nae et al., "Efficient Management of Data Center Resources for Massively Multiplayer Online Games", Proceedings of the 2008 ACM/IEEE Conference on Supercomputing, Nov. 2008, pp. 1-12.*
Ramakrishna et al., "An active self-optimizing multiplayer gaming architecture", Cluster Computing, vol. 9, No. 2, Apr. 2006, pp. 201-215.*
WO 2013/189024 A1, Lin et al., WIPO, Dec. 27, 2013.*
Prasad et al., "A Mechanism Design Approach to Resource Procurement in Cloud Computing", IEEE Transactions on Computers, vol. 63, No. 1, Jan. 2014, pp. 17-30.*
Seo et al., "Best Web Service Selection Based on the Decision Making Between QoS Criteria of Service", International Conference on Embedded Software and Systems, 2005, pp. 408-419.*
"Second Written Opinion Issued in PCT Application No. PCT/US2015/038210", dated May 23, 2016, 6 Pages.
Liu, et al., "GreenCloud: A New Architecture for Green Data Center", In Proceedings of the 6th International Conference Industry Session on Autonomic Computing and Communications Industry Session, Jun. 16, 2009, 10 pages.
Prodan, et al., "Online Gaming in the Cloud", Published on: Nov. 13, 2010, Available at: http://ercim-news.ercim.eu/en83/special/online-gaming-in-the-cloud.
Prodan, et al., "Prediction-Based Real-Time Resource Provisioning for Massively Multiplayer Online Games", In Journal of Future Generation Computer Systems, vol. 25, Issue 7, Jul. 2009, 5 pages.
Waldo, Jim, "Scaling in Games & Virtual Worlds", In Proceedings of Communications of the ACM, Nov. 1, 2008, 7 pages.
"Cloud Based Holdfast Electronic Sports Game Platform", In Proceedings of Case Study of Intel, Apr. 21, 2013, 6 pages.
International Search Report with Written Opinion dated Oct. 5, 2015 in Application No. PCT/US2015/038210, 10 pages.
"International Preliminary Report on Patentability Issued in PCT Application No. PCT/US2015/038210", dated Oct. 11, 2016, 7 Pages.

* cited by examiner

ASSIGNING A PLAYER TO A MACHINE

BACKGROUND

Video games have become increasingly popular. Some video games allow multiple players to interact within the same game using client devices that are remotely located from each other. For example, in a cloud gaming environment, multiple client devices throughout the world could connect over a network to a game hosted on a server in a data center. As the client devices join a game, they are assigned to a particular available data center and server.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the invention are directed to systems and methods for optimizing the allocation of client devices to different available data centers and computers, such as gaming or application servers, within a data center. The allocation may be optimized in a way that maintains a satisfactory user experience. In particular, embodiments of the invention determine a data center and/or server to which a client device is assigned based on a one or more criteria comprising variables related to the client device, user, application, network, or data center. In one embodiment, an allocation algorithm or other analysis is used to determine resource-efficient allocation. For example, the algorithm may be used for scoring available data centers such that a client device is assigned to a data center and server of the data center based on the scores. Further, in one embodiment, a bidding process may be utilized wherein the client device is matched to a data center, and/or a server of a data center, based in part on bids received from the data centers.

Some embodiments of the invention also facilitate real-locating or reassigning client devices during application usage (i.e., game play) to different servers or data centers based on these criteria, which can include forecasted values for some of the criteria. For example, in one embodiment, client device allocation is periodically evaluated to determine if reassignment is needed.

BRIEF DESCRIPTION OF THE DRAWINGS

Embodiments of the invention are described in detail below with reference to the attached drawing figures, wherein.

DETAILED DESCRIPTION

Figure 1:
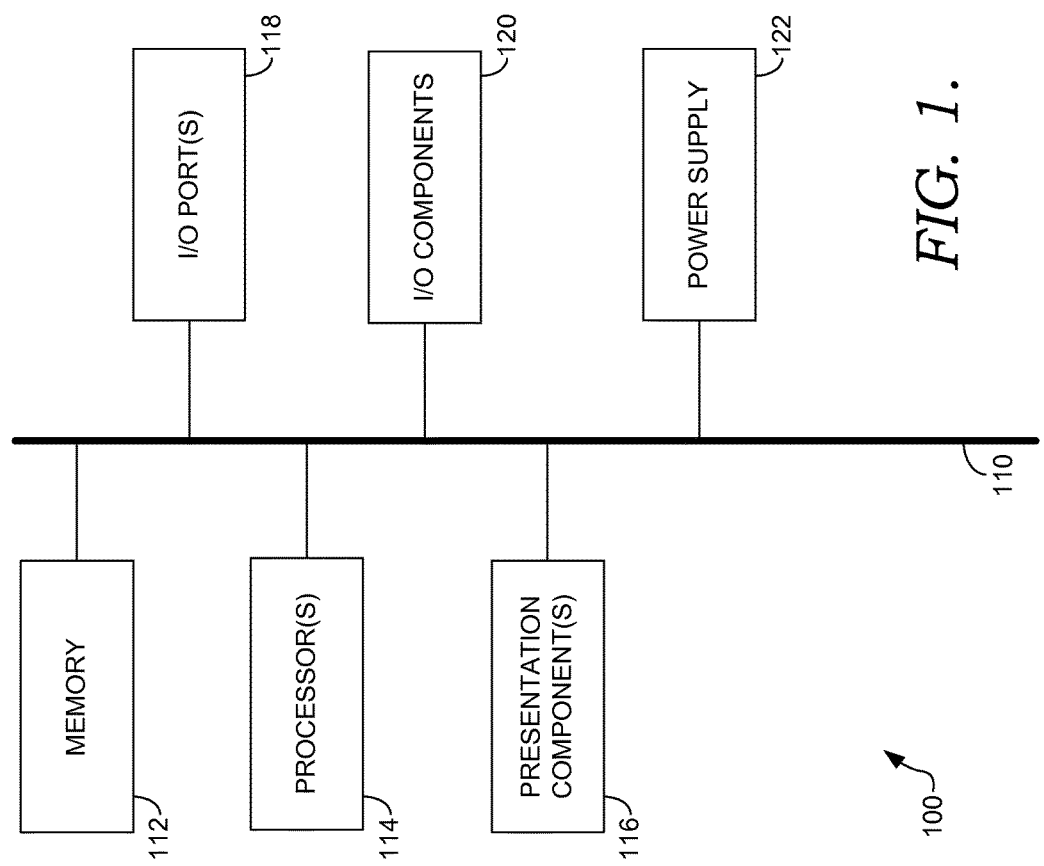
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein are generally directed to systems, methods, and computer storage media for, among other things, optimizing the allocation of client devices, such as gaming client devices, to available data centers and computers, such as gaming or application servers, within the data center. The allocation may be optimized in a way that maintains a satisfactory user experience. In particular, embodiments of the invention determine a data center, and in some instances a server of the data center, to which a client device is assigned based on one or more criteria. The criteria may be related to characteristics of the user, the client device of the user, the application (such as the game) that the user is starting, the network between the user and gaming (or application) server, and/or other criteria related to the data center. Further, the criteria may be based on real-time information, such as current conditions, historical data, or projected levels, which may be used as predictive criteria.

In certain cloud-application environments, such as cloud gaming environments, multiple client devices, which may be located throughout the world, connect over a network to a game (or other application) hosted on a server in a data center. The application service (or game service) provides a remote application environment to which users connect over a wide area network, such as the Internet. For example, a game service could utilize a series of servers, or a series of server farms, on data centers located throughout the world to host video games. Players then connect to the gaming service using a variety of different client devices including game consoles, smartphones, tablets, personal computers, and other computing devices. As the client devices join a game, they are assigned to a particular available data center and server within the data center.

A significant concern with cloud-based gaming and certain cloud-based services and applications is the efficient utilization of resources, such as power, cooling, bandwidth, raw capacity, etc. Cloud-based gaming and certain other services are different than individual web server requests, which can be sprinkled around data centers to balance loads. In contrast, cloud-based gaming has big workloads and draws lots of power. The sessions also tend to be very long running and therefore expensive in terms of computation resources. Therefore, the initial allocation of users to data centers, and servers of the data centers, is important.

Further, once a client device of a given player is assigned to a particular computer in a data center, it cannot readily be moved without disrupting the game (or application) and degrading the user experience. In particular, games and certain cloud-based applications have a durable state on the server. Transferring to another server will likely disrupt the game or application in some manner. For example, in a multi-player gaming session, moving one player to another data center in the middle of a battle would require transferring information about the state of the game, including all other players in the battle, and may introduce delays causing a poor user experience and a strategic advantage to the other players. Thus, unlike many other cloud-based applications, such as checking email, cloud gaming typically keeps a client device allocated to the same server for a gaming session.

Still further, gaming servers are likely to be either on or off and not partially utilized like servers for cloud-based applications such as email. Therefore, it is desirable to allocate players in a way that utilizes the game server resources efficiently. But the allocation, which happens in real time (or near real time), is further complicated because players seeking a connection to a data center and server are typically coming in at a rate of thousands per second and may remain connected to their assigned sever for hours. Thus, the decision for assigning a particular player to a partial server is not trivial.

Accordingly, in one embodiment, an allocation algorithm or other analysis of the one or more criteria is used to determine resource-efficient allocation of the client devices to data centers and servers of the data centers. For example, in one embodiment, the algorithm determines a score of the available data centers, and a client device is assigned to a data center and server based on its score. Further, in one embodiment, a bidding process may be utilized wherein the client device is matched to a data center, and/or a server of a data center, based in part on bids received from the data centers. For example, a data center with higher projected availability, cheaper power, and more efficient network-resource usage may provide a higher bid for a particular user; while a data center that is nearly full from servicing other users, located far from the user, in the South in the summer (potentially hotter), may provide a lower bid and thus be less likely to be allocated the user's client device. The client device of the user is thus likely to be connected to a data center in a manner that optimizes efficient usage of resources while still providing a satisfactory experience for the user. Although in some cases the user may not be provided the best experience possible, the user is nevertheless likely to be provided an experience sufficient for the particular session that minimizes costs and balances the resource needs of the system. Embodiments of the invention facilitate achieving a maximum user experience among all users while balancing costs and use of resources to provide those experiences.

In one embodiment, after the allocation algorithm pairs a client device with a data center and/or server of the data center, data from the particular session is collected and stored. This historical data then may be used for future decision making by training or refining the allocation algorithm.

Some embodiments of the invention also facilitate dynamically balancing loads on the system by reallocating or reassigning users during application usage (such as moving a player during game play) to a different server or data center based on the criteria. For example, in one embodiment, user allocation is periodically evaluated to determine if reassignment is needed. If reassignment of the client device is needed, then at appropriate times, such as between levels or scenes of a game, the client device can be assigned to a different server or data center without significantly interrupting the application (e.g., game play) or degrading the user experience.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 1010 that directly or indirectly couples the following devices: memory 112, one or more processors 114, one or more presentation components 116, one or more input/output (I/O) ports 118, one or more I/O components 120, and an illustrative power supply 122. Bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and with reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 100. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors 114 that read data from various entities such as memory 112 or I/O components 120. Presentation component(s) 1016 present data indications to a user or other device. Exemplary presentation components include a display device, speaker, printing component, vibrating component, and the like.

The I/O ports 118 allow computing device 100 to be logically coupled to other devices, including I/O components 120, some of which may be built in. Illustrative components include a microphone, joystick, game pad, satellite dish, scanner, printer, communication component (e.g., network communication component, radio or wireless communications component, or the like), etc. The I/O components 120 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as stereoscopic camera systems, infrared camera systems, RGB camera systems, and combinations of these, for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

Exemplary Online Gaming Environment

Figure 2:
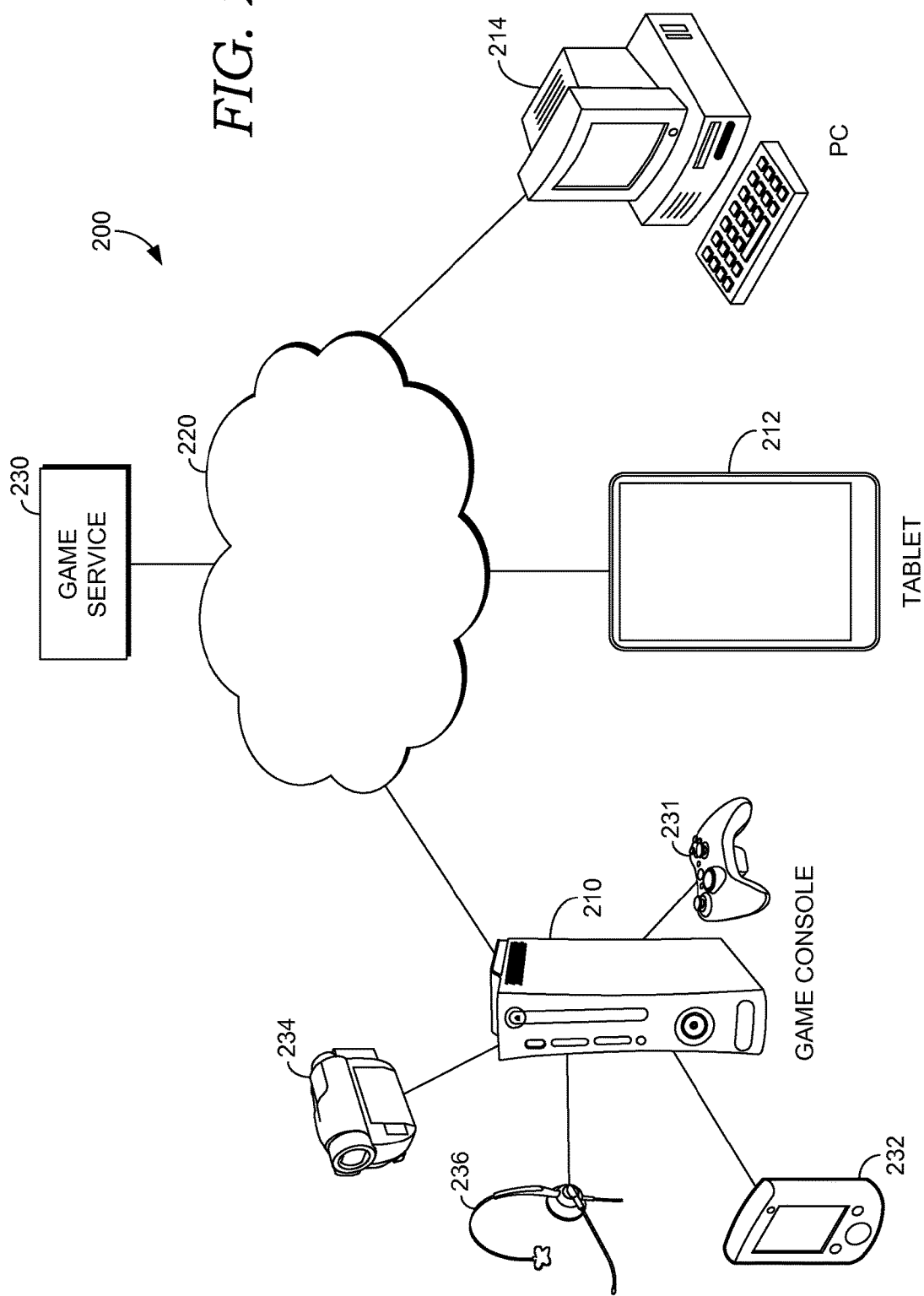
FIG. 2 is a diagram of an online gaming environment, in accordance with an embodiment of the present invention.

Turning now to FIG. 2, an online gaming environment 200 is shown, in accordance with an embodiment of the present invention. The online gaming environment 200 comprises various game clients connected through a network 220 to a game service 230. Exemplary game clients include a game console 210, a tablet 212, and a personal computer 214. Use of other game clients, such as smart phones, are also possible. The game console 210 may have one or more game controllers communicatively coupled to it. In one embodiment, the tablet 212 may act as an input device for a game console 210 or a personal computer 214. In another embodiment, the tablet 212 is a stand-alone game client. Network 220 may be a wide area network, such as the Internet.

The controllers associated with game console 210 include game pad 231, tablet 232, headset 236, and depth camera 234. A game console may be associated with control devices that generate both a rich input and a basic input. Individual controllers are capable of generating different kinds of inputs and a single controller could generate both a rich input and an basic input.

The game pad 231 may be capable of generating basic control signals, such as those generated by button selections and joystick movement. Movement data such as that generated by accelerometers and gyros within the game pad 231 may be examples of rich sensory data. In some implementations, the movement data is not considered a rich sensory data.

The tablet 232 can be both a game controller and a game client as mentioned previously with tablet 212. Tablet 232 is shown coupled directly to the game console 210, but the connection could be indirect through the Internet or a subnet. In one embodiment, the game service 230 helps make a connection between the tablet 232 and the game console. The tablet 232 is capable of generating numerous input streams and may also serve as a display output mechanism. In addition to being a primary display, the tablet 232 could provide supplemental game information near information shown on a primary display coupled to the game console 210, or simply be a control surface. The input streams generated by the tablet 232 include video and picture data, audio data, movement data, touch screen data, and keyboard input data.

The headset 236, captures audio input from a player and the player's surroundings and may also act as an output device if it is coupled with a headphone or other speaker.

The depth camera 234 generates a depth cloud used as a control input. The depth camera 234 may an use infrared camera to determine a depth, or distance from the camera for each pixel captured. Stereoscopic depth cameras are also possible. In addition, the depth camera 234 may capture a typical color stream or picture. The depth camera 234 may have several image gathering components. For example, the depth camera 234 may have multiple cameras.

Game service 230 may comprise multiple computing devices communicatively coupled to each other. In one embodiment, the game service 230 is implemented using one or more data centers (server farms). The data centers may be spread out across various geographic regions including cities throughout the world. In this scenario, the game clients connect to a particular data center based as described herein; for example using an allocation algorithm. Embodiments of the present invention are not limited to this setup.

The game service 230 allows the game to be executed within the computing devices provided by the game service 230. A communication session between the game service and game clients carries input traffic to the game service 230 and returns a rendered game image and/or other game output.

Exemplary Game Client and Game Service for Remote Gaming

Figure 3:
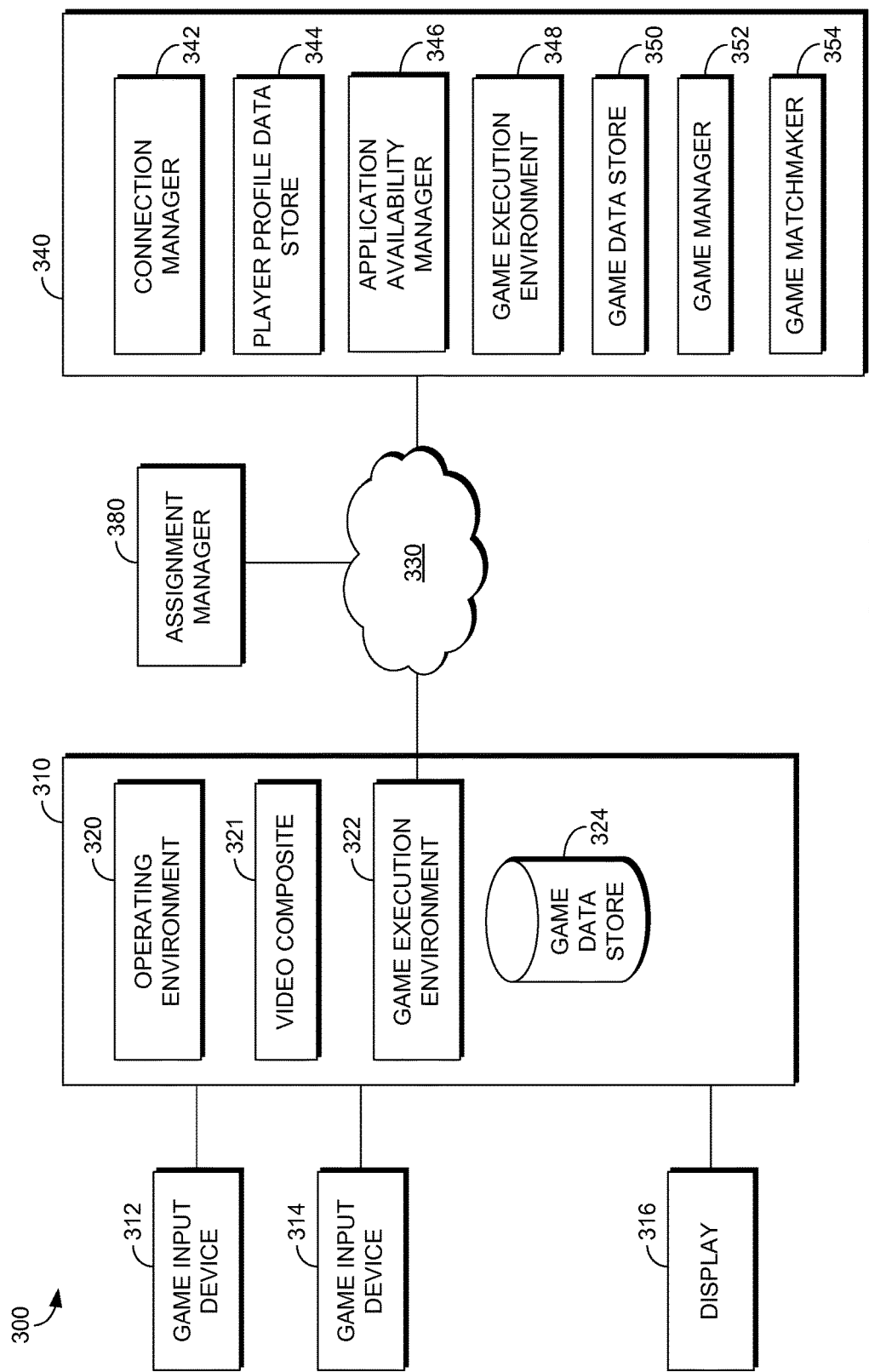
FIG. 3 is a diagram of a remote gaming computing environment, in accordance with an embodiment of the present invention.

Turning now to FIG. 3, an exemplary remote gaming environment 300 is shown, in accordance with an embodiment of the present invention. The remote gaming environment 300 includes a game client 310, a game server 340, and an assignment manager 380 communicatively coupled through a network 330. In one embodiment, the network may be the Internet. The game client 310 is connected to a first game input device 312, a second game input device 314, and a display 316. Exemplary game input devices include game pads, keyboards, a mouse, a touch pad, a touch screen, a microphone for receiving voice commands, a depth camera, a video camera, and a trackball. Embodiments of the present invention are not limited to these input devices. The display 316 is capable of displaying video game content. For example, the display 316 may be a television or computer screen. In another embodiment, the display 316 is a touch screen integrated with the game client 310.

The game client 310 is a client computing device (client device) that is able to execute video games or similar applications. The game client 310 could be a tablet or a laptop computer. In another embodiment, the game client 310 is a game console and the display 316 is a remote display communicatively coupled to the game console. The game client 310 includes an operating environment 320, a video composite component 321, a game execution environment 322, and a game data store 324. Other components of the game client 310 are not shown for the sake of simplicity.

Assignment manager 380 assigns a particular game client 310 to a particular game server 340 at a particular data center. For example, in one embodiment, when a user initiates an online gaming session, game client 310 connects through network 330 to a game server 340 in order to play a particular game desired by the user. Assignment manager 380 assigns game client 310 to a specific game server 340 based on one or more criteria relating to the game, game client 310, network 330, and game server 340. The criteria may include real-time criteria, such as how full a particular game server is (e.g., how many other client devices it is serving), and historical criteria, such as criteria specific to the user; for example, the user typically plays for 4 hours at a time. Additional details regarding assignment manager 380 are provided in connection to FIG. 6.

The client devices connected to the game session may play different roles for different games. In one embodiment, the client devices only send control signals to the game session. The game code running in the game session processes the control signals to change the game state. For example, a player or object within a game may move in response to the control input. The game instance may generate a rendered video game image that reflects the updated game state and communicate the rendered image to one or more clients connected to the game instance running in the game session. Each client may receive different rendered video game images from the perspective of the player associated with the client. Though described as a client from the perspective of the game service, the client could be a server to other computing devices. For example, a computing device within a residence could serve game content to other computing devices, including tablets or smartphones over a local area network.

In another embodiment, game geometry and other game information is sent from the server and combined with image data resident on the client to generate a rendered video game image on the client device. Other divisions of processing between the client and game service are possible.

The operating environment 320 may be provided by an operating system that manages the hardware and provides services to applications running on the game client 310. The operating environment may allocate client resources to different applications as part of game and communication functions.

The game data store 324 stores downloaded games, game samples, and/or partially downloaded games. Games may be downloaded in playable blocks. To play a game, the game may need to be loaded from the game data store 324 into active memory associated with the game execution environment 322. The game data store 324 may also store player progress files.

The game execution environment 322 comprises the gaming resources on the client 310 required to execute instances of a game or part of a game. In some embodiments, the client 310 does not include a game execution embodiment or the computing resources to execute the game. The game execution environment 322 comprises active memory along with computing and video processing resources. The game execution environment 322 receives gaming controls and causes the game to be manipulated and progressed according to game programming. In one embodiment, the game execution environment 322 outputs a rendered video stream that is communicated to the display 316. The game execution environment 322 may execute part of a game to generate game images that are combined with rendered images received from the game server 340 by the video composite component 321.

The video composite component 321 merges rendered video game images received from the game server 340 with rendered video game images rendered by the client 310 to form a single image that is output to display 316. Rendered video game images could refer to just a single color image or the color image and depth buffer data that is used to successfully composite server and client images. The video composite component may perform scaling and other functions to generate a video output that is appropriate. Some embodiments of the present invention do not use or comprise a video composite component 321.

The game server 340 comprises a connection manager 342, a player profile data store 344, a game availability manager 346, a game execution environment 348, a game data store 350, a game manager 352, and a game matchmaker 354. Though depicted as a single box, the game server 340 could be a server farm that comprises numerous machines, or even several server farms of a data center. For example, several of the servers could act as clients for a central server that coordinates the game experience.

The connection manager 342 builds a connection between the client 310 and the server 340, once the particular client 310 has been assigned to the server 340 according to assignment manager 380. The connection manager 342 may also provide various authentication mechanisms to make sure that the user is authorized to access the game service provided by the server 340. The connection manager may provide security, encryption, and authentication information to servers and virtual machines as they are added to a game session. The connection manager 342 may also analyze the bandwidth available within a connection and provide this information to components, such as assignment manager 380, as needed. For example, the resolution of the video game image may be reduced to accommodate limited bandwidth.

The player profile data store 344 may work in conjunction with the connection manager 342 to build and store player information. Part of the player profile may comprise demographic and financial information such as a player's name, address and credit card information or other mechanism for paying for or purchasing games and experiences provided by the game service, as well as a subscription level or tier information; for example, data indicating whether the player is premium subscriber or is a trial user.

In addition, the player profile data store 344 may store a player's progress within an individual game. A player's score, achievements, and progress through game levels may be stored. Further, the player profile data store 344 may store information about individual player preferences such as language preferences. The player may access the game level information from multiple clients. For example, the player's progress could be accessed from a friend's game console or on the player's mobile device.

Information regarding a player's game client and speed of the network connection may also be stored in the player profile data store 344 and utilized to optimize the gaming experience, as described herein. The player profile data store 344 may also store a usage history for the individual player. A player's history of purchasing games, sampling games, or playing games through a game service that does not require the purchase of the games may be stored. In some embodiments, information stored by player profile data store 344 includes historical information about the player's activity, such as the games typically played by the player and average session times associated with those games.

Information from player profile data store 344 may be provided by game server 340 to assignment manager 380 as criteria used for player allocation.

The application availability manager 346 analyzes the usage data to determine, among other things, how many standby instances of a particular game title or application should be available. In general, games with a high demand will have more standby instances of a game available. Loading a game into active memory to create a standby instance may take a minute or two; thus, games with high churn in and out may also require more standby instances of games to be available. The time it takes to create a standby instance of a particular game title also should be considered. Games that load comparatively quickly may require less standby instances because additional game instances can be generated more quickly as demand changes. In other words, games with a slower load time may require more available standby games.

The application availability manager 346 may also provide information used by game manager 352 or other components, such as assignment manager 380, to allocate server resources to a particular game pool. Server resources allocated to a particular game pool include the resources needed to execute the active game instances as well as the standby game instances that have no player connected. As demand for various game changes over time, the allocation of resources to game pools can be adjusted. Further, historical usage data may be utilized to anticipate changes. For example, if a first game is played more heavily between 10:00 p.m. and midnight than a second game that is played more heavily during the day, then resources may be switched between the second and first game for the 10:00 p.m.-to-midnight period.

In one embodiment, application availability manager 346 includes functionality of assignment manager 380, or works with assignment manager 380, such as providing information to assignment manager 380 for allocation decision making. For example, application availability manager 346 may provide different allocations of standby games to different data centers based on the demographics of players likely to be served by the data center. For example, if a particular game is popular in the Northwest of the United States, then more standby instances of that game title may be available within data centers located in the Northwest. On the other hand, games that are more popular in the Southeast may have comparatively more standby game instances within data centers located in the Southeast.

The application availability manager 346 may provide the game demand information to the game manager 352 and assignment manager 380, as well as other components. The availability analysis may be very granular based on the data center, time of day, and other events. In one embodiment, when the resources allocated to a particular game are maxed out so that a player is not able, on a temporary basis, to play the game, the game matchmaker 354 may be notified and that game is temporarily removed from the game list. This prevents a player from selecting a game and having a delay before playing. Similarly, in one embodiment, assignment manager 380 may be notified whereupon it can be determined whether a particular client device connected to game server 340 is a candidate for transferring to another server, thereby freeing up resources. For example, as further described below, a player playing a game with high tolerance for latency (such as chess) may be able to be transferred from game server 340 to another game server without noticeable disruption of the game. As another example, a player playing a particular game may be between scenes or levels of the game and therefore capable of being transferred to another server, without degrading the user experience.

The game execution environment 348 comprises the gaming resources required to execute instances of a game. These are the resources described previously that are managed by the game manager 352 and other components. The game execution environment 348 comprises active memory along with computing and video processing. The game execution environment 348 receives gaming controls, such as reduced controller input, through an I/O channel and causes the game to be manipulated and progressed according to its programming. In one embodiment, the game execution environment 348 outputs a rendered video stream that is communicated to the game client. In other embodiments, the game execution environment 348 outputs game geometry, or other representations, which may be combined with local objects on the gaming client to render the gaming video.

The game data store 350 stores available games. The games may be retrieved from the data store and loaded into active memory for use in a game session. The game data store 350 may be described as passive or secondary memory. In general, games may not be played off of the game data store 350. However, in some embodiments, the secondary memory may be utilized as virtual memory, in which case portions of the game data store 350 may also serve as active memory. This illustrates that active memory is not necessarily defined by a particular hardware component, but is defined by the ability of the game resources to actively manipulate and access objects within the memory to execute the game.

The game manager 352 manages players' connections to active games. In one embodiment, there are individual game managers for each game available through the game service. Taking a single game as an example, the game manager will drop players into requested games. In one embodiment, a player may connect to a game through the game manager 352. In other words, the game manager 352 may act as a gatekeeper for communications and connections between individual game instances. When a player drops out of a game, an instruction may go to the game manager 352 to retrieve and save the player's progress into the player's profile within player profile data store 344.

The game matchmaker 354 tracks ongoing game sessions and helps player find a game session to join. The game matchmaker 354 may generate an interface that allows prospective players to search for game sessions in which a friend is participating. The matchmaker 354 may allow players to search for active game sessions having players with similar skill levels, for example, as indicated by player rank, game progress, or achievements obtained within a game. In one embodiment, the matchmaker 354 only returns game sessions having space available for more players.

In another embodiment, the matchmaker 354 may provide assignment manager 380 and/or to game client 310, a list of currently closed game sessions with an estimated wait the player can expect before an opening is available. The wait may be calculated by analyzing churn for the session. The churn measures the rate at which players leave the game session. The churn may be calculated using an average for all game sessions of the same game title. The churn may be specific to the particular game session. Wait time may also take into consideration other players waiting to join. Thus, if four players were waiting to join a session that averages an opening every 30 seconds, then the estimated wait time would be two minutes. The matchmaker 354 may manage a queue of players waiting to join a game and add them to the game as openings become available.

The matchmaker 354 may also generate a list of open game sessions for a player to join. The list may be filtered, even without the prospective player's input, to only list sessions with similar level players or that are otherwise appropriate for the prospective player. For example, only game titles the player has a license to play may be listed. In another embodiment, all games are listed, but an indication lets the player know which games will require purchase of an additional license. The players are given the opportunity to buy a license to play a game through the interface.

The matchmaker 354 may make an effort to keep game sessions full, while killing others, by manipulating the game sessions listed for new players to join or providing information to assignment manager 380 for transferring client devices to different servers. Thus, Players are directed to game sessions in a way that further minimizes the overall use of computing resources within the game server 340. For example, an effort may be made to keep game sessions full of players instead of having twice as many half-full game sessions. Thus, if a game session is near a threshold number of players where computing resources could be removed, then that game session may not be listed, unless responsive to a specific query for another player or other sought out characteristics unique to that session. This allows the game session to fall below the threshold and for resources to be removed. On the other hand, game sessions with only a few openings may be listed first in an effort to keep the game session full.

Thus, the matchmaker 354 provides search tools to help players find an open game session that meets their needs. When multiple games sessions meet the player's needs, assignment manager 380 and matchmaker 354 may allocate the player to a specific game session in a way that minimizes the total number of game sessions running at a given time, The matchmaker 354 and assignment manager 380 may also select game sessions for player to conserve network resources and provide a better game experience. The matchmaker 354 may look at characteristics of the players' local capabilities for selecting appropriate game session computing resources and provide these to assignment manager 380. As an example, the type of console or the version of the game the player is using may influence which computing resources are selected to run a game session. Further, the player's geographic location may influences which data center the player is connected to, in order to minimize network latency. Assignment manager 380 will prioritize connection to game sessions running in the preferred data center.

Figure 4:
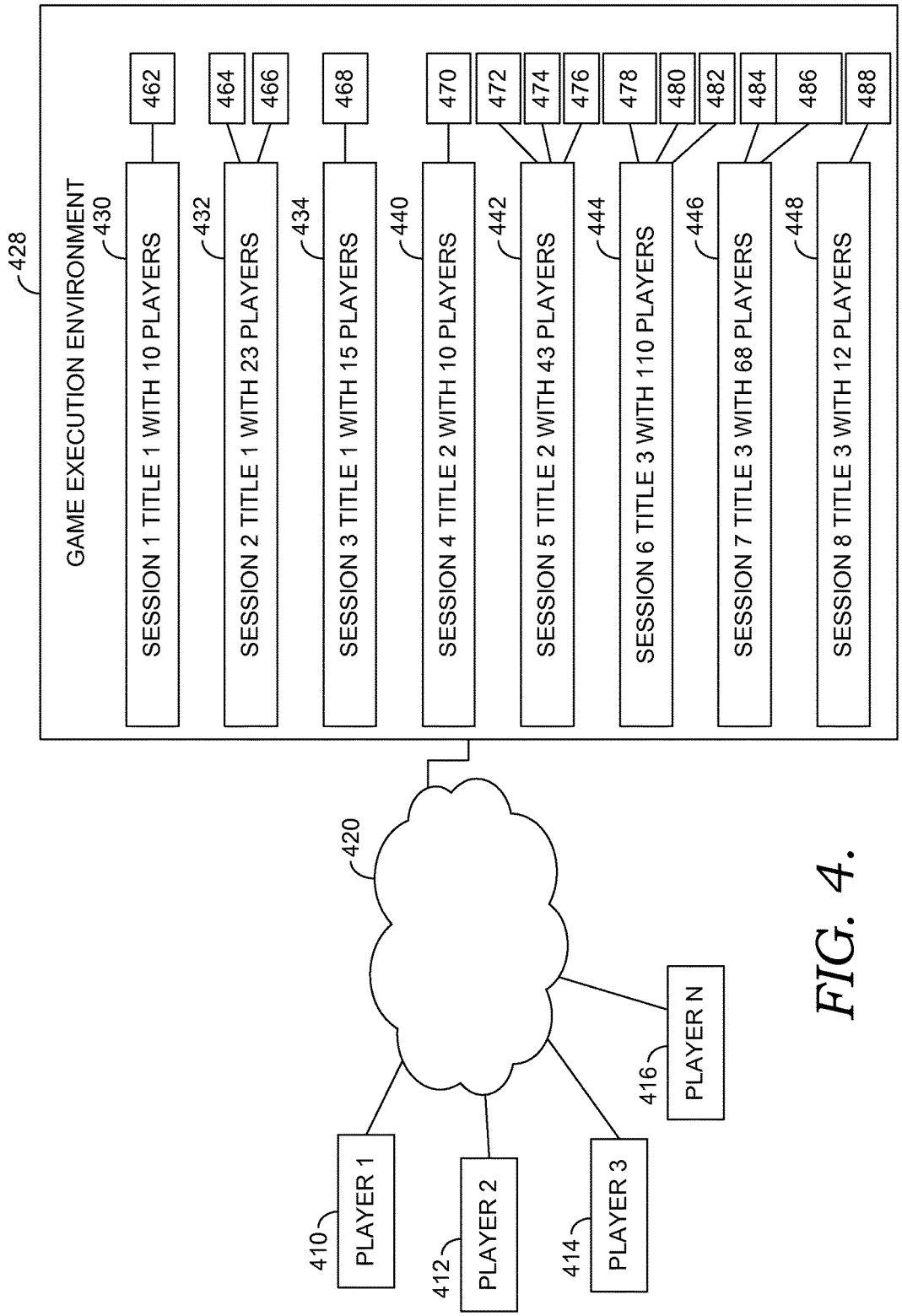
FIG. 4 is a diagram of a game execution environment that is running active game sessions with players connected and computing resources allocated, in accordance with an embodiment of the present invention.

Turning now to FIG. 4, a game execution environment 428 that is running active game sessionss with players connected and computing resources allocation, is illustrated in an accordance with an embodiment of the present invention. The game execution environment 428 may be similar to the game execution environment 348 described previously. The game execution environment 428 may be part of a game service such as described previously with reference to FIGS. 2 and 3. For the sake of simplicity, other components within the game service are not shown. The game execution environment 428 is connected to various game clients through network 420. Some of the clients may be other servers, while other clients are game consoles. As mentioned previously, other components such as authorization and connection management components and game managers may route communications between the network 420 and the game execution environment 428.

As can be seen, player 1 on client device 410, player 2 on client device 412, player 3 on client device 414, and player N on client device 416 are connected to the game execution environment 428. Player N is intended to illustrate that any number of players might be remotely connected to the execution environment. Many of the connected players and clients are not shown for the sake of simplicity. As mentioned previously, when players are connected, their player profile information and other I/O channel details may be incorporated into the active game to allow them to play the game.

The game execution environment 428 comprises eight sessions. Each session has computing resources allocated to it. The first session 430 is running title one and has ten players. Computing resource 462 is allocated to session 430. Computing resource 462 may be a single machine, or a virtual machine.

The second session 432 is also running title one but has 23 players. Session 432 is associated with computing resource 464 and computing resource 466. In this example, computing resource 464 and computing resource 466 have the same capacity. That does not need to be the case as will be illustrated subsequently.

The third session 434 is also running title one and has 15 players. Session 434 is associated with computing resource 468. In this illustration, the game session monitor may allocate additional computing resources to a game session running title one when more than eighteen players are within the session. Thus, the third session 434 has a single computing resource 468 with 15 players while the second session 432 has two computing resources allocated to it because it has more than 18 players, with 23.

The fourth session 440 is running a second video game title and has ten players. Title two is different than title one. Computing resource 470 is allocated to game session 440.

The fifth session 442 is also running title two and has 43 players connected. Computing resource 472, computing resource 474, and computing resource 476 are all allocated to session 442. As can be seen, three resources are allocated to session 442 and one resource is allocated to 440 because of the different number of players in the respective sessions. As mentioned, the amount of CPU usage or other game or computing characteristic may be monitored and computing resources allocated according to thresholds.

In one embodiment, characteristics of multiple computing resources are monitored and compared to a threshold. The threshold for each characteristic may be a percentage of the associated resource's total capacity. The same thresholds may be used across multiple game titles to allocate resources or different threshold could be used for different titles.

The sixth session 444 is running title three with 110 players. Title three is different than title one and title two. As mentioned previously, the thresholds of players used to allocate resources may differ from title to title. Further historical usage patterns may be monitored to allocate resources on a per title basis. For example, titles that commonly attract large numbers of players may start out with more resources. This is indicated by the larger size of computing resource 478 which is allocated to the sixth session 444. A smaller computing resource 480 is also allocated to the sixth session 444. Thus, computing resources of different size may be allocated to game sessions when appropriate.

The different size may reflect the size of virtual machines or physical machines that have a different computing capacity. Computing resource 482 is also associated with the sixth session 444 and is the same size as computing resource 480. This illustrates that a game title may initially start with a larger computing capacity but could be incrementally increased using smaller size computing resources.

The seventh session 446 is also running title three and has 68 players. Computing resource 484 and computing resource 486 are allocated to the seventh session 446. As can be seen, computing resource 486 is larger than computing resource 484.

The eighth session 448 is running title three with 12 players. Computing resource 488 is allocated to the eighth session 448.

In one embodiment, the game session monitor provides real time and historical information regarding computing resources to the assignment manager. In one embodiment, the information is provided in a form of a bid on a potential player (client device) seeking to connect to game execution environment 428. Based at least in part on the information, the assignment manager determines whether to assign the player's client device to the server associated with game execution environment 428.

Figure 5:
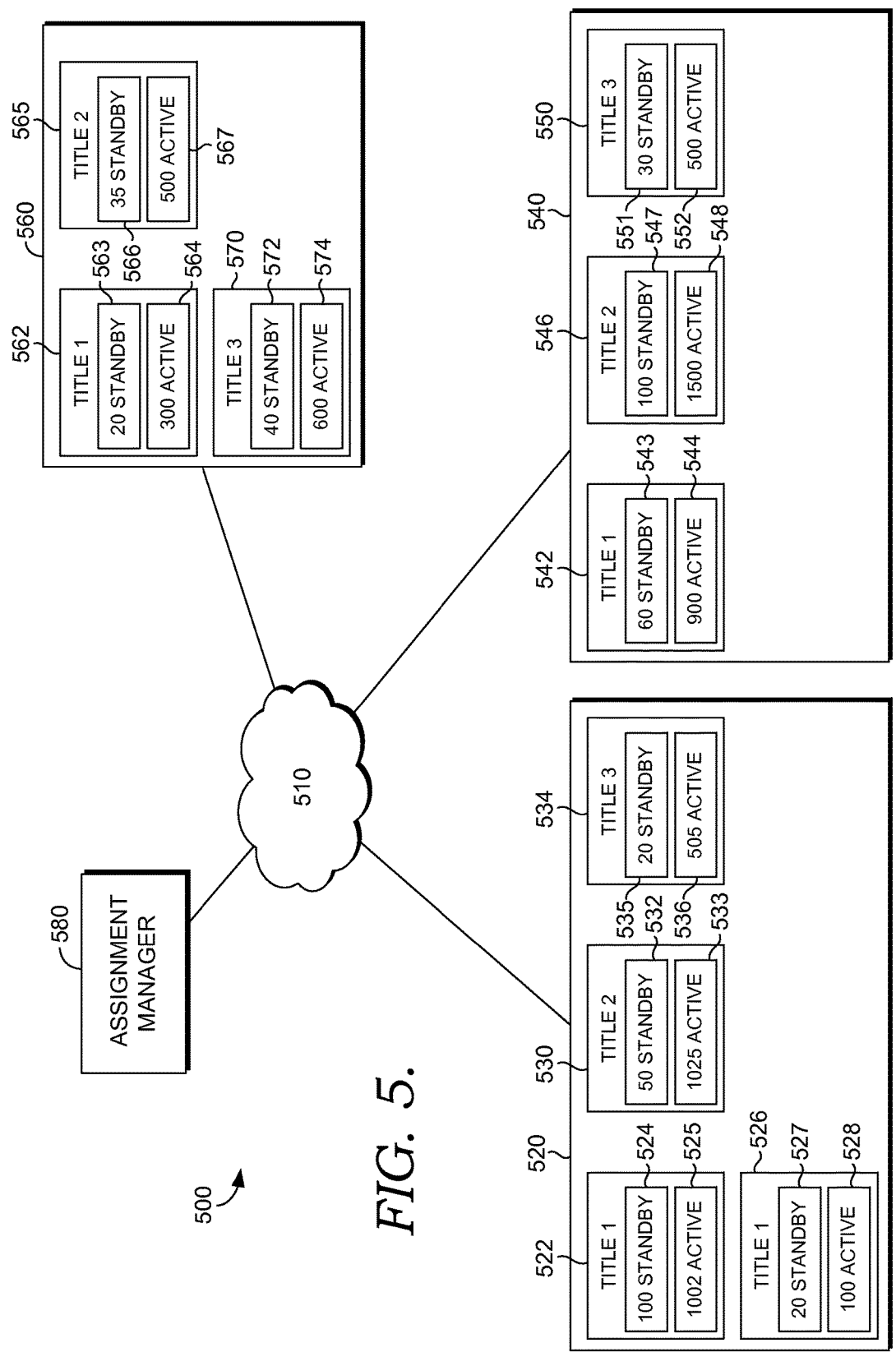
FIG. 5 is a diagram that illustrates allocation of standby and active game instances within a remote computing environment, in accordance with an embodiment of the present invention.

Turning now to FIG. 5, pools of standby game instances are illustrated, in accordance with an embodiment of the present invention. The remote game environment 500 Includes data center 520, data center 540, data center 560, and assignment manager 580 connected by network 510. Each data center hosts game service (or application service) that provides various game titles (or application). For the sake of clarity, environment 500 shows only three data centers, although it is contemplated that there could be many more. The game service may be similar to the game server 340 described previously with reference to FIG. 3, and the assignment manager 580 similar to assignment manager 380 described previously with reference to FIG. 3.

Data center 520 includes four game pools. Game pool 522 and game pool 526 host instances of a game title one. Game pool 530 hosts instances of title two and game pool 534 hosts instances of a game title three. Game pool 522 includes 1002 active instances 525 of the game title one and 100 standby instances 524. Game pool 526 includes 20 standby instances 527 and 100 active instances 528. The game pool 530 includes 1025 active game instances 533 and 50 standby game instances 532. The game pool 534 includes 505 active instances 536 and 20 standby instances 535.

Game pools 522 and 526 are both dedicated to hosting the same game title. Game pool 526 is an example of a sandbox. A sandbox is a virtual partition of the computing resources dedicated to a particular task. For example, game developers or premium members may be the only individuals able to access games within game pool 526. The anticipated demand for each game pool may be calculated separately based on the characteristics of the particular game pool being evaluated. These calculations may be provided as criteria to assignment manager 580, for use in determining allocation of client devices to data centers 520, 540, and 560.

The data center 540 hosts three game pools with the same three titles hosted by data center 520. Notice that the amount of standby active games for each title differs from those in game pools within data center 520 or data center 560. The demand for a game may differ from data center to data center. In one embodiment, a demand calculation is made for each pool of games. The demand calculation takes into account performance within the data center hosting the game pool. For example, computing resources may be brought on more quickly in some data centers than in others. All else being equal, data centers that bring games online more quickly need less standby instances to meet demand. Such data centers may be scored higher using the allocation algorithm (described in connection to FIG. 7) against client devices operated by users with premium subscription levels, for example. Additionally, historical usage at different data centers also may be used to calculate demand for the particular game pools within the data center and provided to assignment manager 580.

Game pool 542 includes 60 standby instances 543 and 900 active instances 544. Game pool 546 includes 100 standby instances 547 and 1500 active standby instances 548. Game pool 550 includes 30 standby instances 551 and 500 active instances 552.

Data center 560 hosts three game pools. Game pool 562 includes 20 standby instances 563 and 300 active instances 564. Game pool 565 includes 35 standby instances 566 and 500 active instances 567. Game pool 570 includes 40 standby instances 572 and 800 active instances 574.

In addition to managing the game instances, computing resources associated with the game instances may be managed by adding and subtracting computing resources to a game service as needed. Within the game service, the computing resources may be assigned to a monitoring group or pool of game instances. Network resources may also be managed by the game service to facilitate communications between the client devices and the game session. Thus, as additional computing devices are allocated to a game service, the network resources may be updated to route communications appropriately to the computing devices on which the game service is running.

When allocating new resources to a game service, the resources may be selected for their proximity to the computing resources already serving the game service. For example, in a game service running over multiple data centers, a computing resource located within the same center may be favored over a computing resource in a different server farm. In one embodiment, this may be reflected in a resources score component associated with the data center and used by assignment manager 580. Similarly, a server with close proximity within a rack or virtual relationship with the machines already part of the game session may be preferred, and thus have a better score, over those having a less proximate relationship. Computing resources may be recycled from an active game session that ends to an active game session running the same title, perhaps at the same game stage.

As can be seen in FIG. 5, different game pools have different amounts of standby games. As mentioned, demand for a particular game may be forecast and used to determine how many standby game instances should be provided. Additionally the forecasted demand may be provided as criteria to assignment manager 580 for determining whether to allocate client devices to the data centers. In one embodiment, this criteria is reflected in a bid for candidate players (client devices) based on resource availability and forecasted demand.

Each game, and each game pool, may be associated with different characteristics that result in a different optimal amount of standby games, which is may be reflected in the information communicated to the assignment manager 580. This description of demand forecasting describes calculated demand for a single game pool, for the sake of simplicity. In an actual embodiment, a similar calculation will be performed for each game pool. Similarly, a calculation could be performed for each data center or other grouping of games and used to forecast demand for resources related to game instances. For example, the computer resources needed to host game instances may be added at the same rate that demand for game instances increases.

Figure 6:
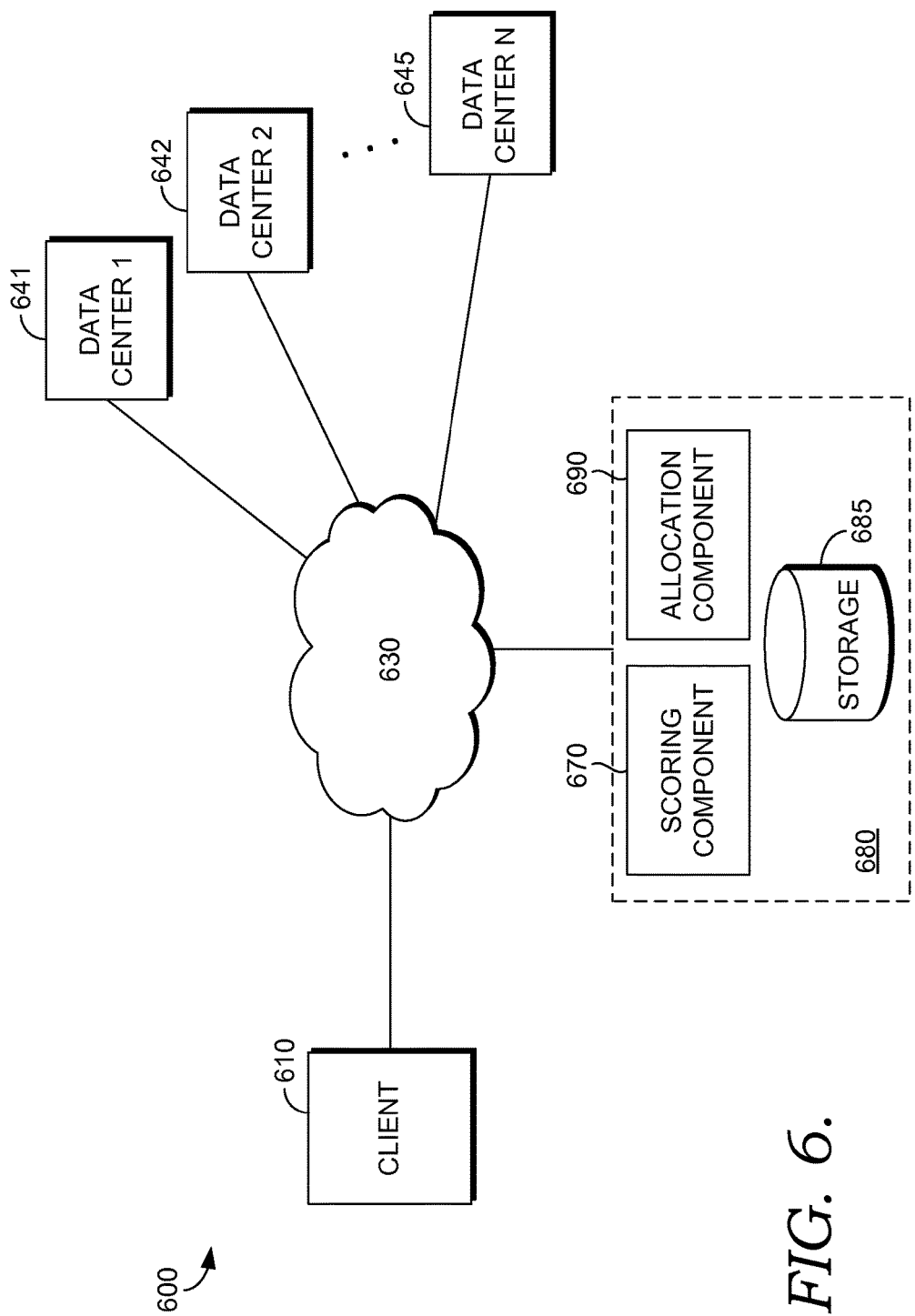
FIG. 6 is a diagram that illustrates allocation of a client device to a data center, in accordance with an embodiment of the present invention.

Turning now to FIG. 6, another aspect of a remote gaming environment is shown and referenced generally as environment 600. The remote gaming environment 600 includes a client device 610, a plurality of data centers 641, 642, and 645 (represented as data centers 1, 2, and through data center N, respectively), and an assignment manager 680 communicatively coupled through a network 630. In one embodiment, the network may be the Internet. Client device 610 may be similar to game client 310 described previously with reference to FIG. 3; and data centers 641, 642, and 645 may be similar to data centers 520, 540, and 560 described in connection to FIG. 5 or game server 340 described in connection to FIG. 3.

Assignment manager 680 assigns a particular client device 610 to a particular data center (e.g., data center 641, which is representative) and in some instances a particular server within the data center. In some embodiments, a managing or allocation component within the assigned data center further assigns the client to a particular server. For example, game manager or game matchmaker components, such as described in connection to FIG. 3.

At a high level, when a user initiates an online gaming or application session, client device 610 communicates through network 630 to a data center 641 in order to play a particular game desired by the user. Assignment manager 680 assigns the client device 610 to a particular data center and server based on one or more criteria relating to the game, client device 610, network 630, and data centers 641, 642, and 645. The criteria may include real-time criteria, such as the current usage levels of a particular data center or server within a data center (e.g., how many other client devices it is serving), network conditions, and historical criteria, such as criteria specific to the user (for example, the user typically plays for 4 hours at a time) or learned information, such as knowledge that Saturday day at 8 pm in a certain region, at least one hundred thousand users will begin streaming movies or playing a particular game.

In one embodiment, the client device 610 sends information to manager 680 about the client and/or user. This may happen as the client device 610 is seeking a connection to one of the data centers to play a game, for example. Similarly, one or more of the data centers send information to assignment manager 680. Based on criteria in the client information and data center information, the assignment manager 680 allocates the player to a particular data center. The assignment manager may also use historical information and other real-time information, such as communication network conditions, time of day, outside temperature at respective data centers, as inputs to the allocation decision making.

As described previously, assignment manager 680 assigns a client device 610 to a particular data center and server based on criteria representing real-time, historic, or projected metrics relating to the game, client device 610, network 630, and the data centers. By way of example and not limitation, criteria related to the data centers may include information related to: load levels; temperature and cooling distribution; power or energy usage, which may include the cost of electricity or power distribution (including reactive power usage); server or processor utilization; content distribution and content available on the data center gaming (or application) servers; time of day (including patterns or trends) and location of the data center, distance from the user(s), which may include distance from users likely to use content currently loaded into the game servers of the data center; user levels; server availability; maintenance cycles and scheduled maintenance times, including requests for maintenance (e.g., requests from management services); machine wear and tear (for example, balancing wear and tear across particular servers or targeting specific machines wear out sooner because those machines are scheduled to be refreshed), which may be reflected in product life cycles and/or warranty cycles; hardware use optimization, including hardware usage patterns for maximizing hardware lifecycle due to the limited operational lifecycles associated with hardware; or historical play information, which may include user-provided feedback (such as a star rating) from previous sessions.

Criteria related to the user can include, by way of example and not limitation, user subscription level (for example, a premium subscribing user vs. a free user or a trial user, or whether the user is a customer of a subscribing service or company); usage history, such as average session time (for example, does this player usually play fifteen minute matches or 7 hour sessions); gaming experience quality, which may vary based on the game or user-provided feedback (including feedback from other users); or geographic location, including location with respect to other users in the same session of a multi-user game or application. Criteria related to a client device 610 may include, by way of example and not limitation, information about the client device such as its operating system and version, hardware specifications or available resources such as processing capability, and network conditions associated with the client device, such as available bandwidth and latency.

Criteria related to a game or application may include, by way of example and not limitation, information about game bandwidth requirements, minimum frame rate (for example, Halo may require 30 or more frames-per-second (fps), but a game such as black jack would require much less; therefore, Halo has higher bandwidth requirements); latency characteristics of the game, which may include minimum latency requirements; and historical or projected session times for playing the game, which may also be related to the player. In one embodiment, game criteria may be specified in metadata associated with the game or determined historically from data collected over gaming sessions. Criteria related to the network can include, by way of example and not limitation, standard networking information, such as quality of routes (e.g., packet loss, jitter, available bandwidth, etc.); information about network latency, which may be quantified in milliseconds and may also include input latency (e.g., when a user moves a game character to the right, the number of milliseconds it takes to adjust the player to the right on the user's screen); or routing costs considerations such as peak bandwidth costs as may be determined from the 95/5 model. In one embodiment, latency is based at least in part on real-time determined latency and/or historical data including user feedback, such as a star rating, for example. In one embodiment, some network criteria may be determined by sending a test signal or from the communications between client 610, assignment manager 680, and data center 641 including communication to request a session by the client or to provide other criteria to assignment manager 680. In one embodiment, network criteria may be determined from other users or from past sessions with the user (historical information).

As mentioned previously, in some embodiments additional criteria may be used by assignment manager 680. Examples of additional criteria may include, by way of example and not limitation, time of day at the locations of the data centers or users; knowledge of holidays (numbers of users playing games may be greater on holidays); or game release dates. In some embodiments, the criteria are not simply limited to the above examples but include projected or forecasted levels of the criteria, given a plurality of users on the data center for extended sessions.

In one embodiment, following a user session, the user is solicited to provide feedback, such as in the form of a star rating. The feedback represents the user's experience with the session. For example, a poor-quality user experience may receive 1 or no stars, while a high-quality experience may receive 4 or 5 stars. This feedback may be used to extrapolate information about criteria related to user experience and then used to determine or adjust those criteria. This feedback also may facilitate determining acceptable ranges of criteria related to the game or network. For example, if the user indicates a poor experience, then the assignment manager or another component may analyze the network conditions, the game the user was playing, or past user ratings for the data center used by the user. Based on the analysis, criteria related to the game, network, or data center may be adjusted (or set). For example, if the analysis determines that a certain latency was present during the session, but the user still reports a poor experience, then criteria related to the game's latency tolerance may be adjusted to indicate that the game is even less tolerant of latency than previously determined.

Assignment manager 680 includes a scoring component 670, an allocation component 690, and storage 685. Allocation component 690 allocates a client device 610 to a data center 641 based on the result of an allocation algorithm or similar analysis (such as the score) provided by scoring component 670. In one embodiment, allocation component 690 facilitates establishing a communication session between client device 610 and data center 641, for example, by providing the address of the matched data center and server to the client device 610. In one embodiment, allocation component 690 functions as a broker between client device 610 and data center 641 to set up a session. In some embodiments, allocation component 690 tracks current allocations or receives information about current allocations from data centers and provides the information to scoring component 670 for reallocation.

Storage 685 stores scoring criteria, such as weights, exchange rates, score cards and criteria thresholds, used by scoring component 670. In some embodiments, storage 685 also stores models information for scoring models used by scoring component 670 and historical information including previous assignments information collected from past sessions, which may be used for tuning the scoring models. In some embodiments, storage 685 stores information about current and past allocations.

Scoring component 670 applies an allocation algorithm or other analyses based on one or more of the criteria described previously to determine assignment of client devices to data centers, and in some instances to servers within a data center. Scoring component 670 determines user allocations in real time in order to adapt to the changing load of data centers and users. In one embodiment, one or more criteria are received from the user/client device, data centers, or storage 685. The values of the criteria may be normalized, in some cases. The criteria are weighted (including a weighting coefficient of 1) and used to generate a score for candidate data-center-client-device matching. In some embodiments, a subset of the criteria may be used. The score represents an estimated cost and/or quality of a given user experience for a particular client device matched to a particular data center and may comprise a single scalar value, a vector or matrix, or a function. For example, in one embodiment, the score comprises a set of values representing projected cost and level of user experience or level of user experience as a function of cost. In one embodiment, a partial score is determined for the weighted criteria (or subset of the criteria) and summed together to produce a score.

In one embodiment, upon a user initiating a connection to a gaming session, the cost for each candidate matching of a data center to a client device is determined based on criteria received from each candidate data center and criteria received from the user/client device. In some embodiments, the received information includes historical information such as average session length for this user, network requirements of the game the user desires to play (e.g., whether the game has a high latency tolerance like chess or a low latency tolerance like Halo), and the like. Criteria may also be received from storage 685.

In some embodiments, scoring component 670 scores a subset of the criteria with a degree of weighting based on a business desire. For example, if, based on the criteria, it is determined that the user is a premium subscriber, then certain other criteria (such as cooling or energy-related costs) may be weighted less than criteria such as bandwidth, because it is desired to provide a premium experience to the paying user. Similarly, in some cases, a poorer user experience may be acceptable, because the user is a free user.

In some embodiments, scoring component 670 determines which criteria to use, which may be based on business desires or other criteria. For example, suppose the game which the player desires to play is single-player black jack, which has a high latency tolerance. Using these criteria, scoring component 670 may bias bandwidth criteria of candidate data centers and assign this player's client device to the data center with poor bandwidth (which could be on the other side of the world). (Additionally, based on the game criteria of black jack, the client device could be designated as being a candidate for transfer to another data center during a session, if needed, because of the high latency tolerance of the game.)

In some embodiments, the scoring may be non-linear; for example, criteria may be determined to meet acceptable ranges (e.g., acceptable temperature ranges) or thresholds (e.g., minimum bandwidth level satisfied, fps exceeds minimum required level, latency is below a maximum tolerable amount, etc.). In one embodiment, some criteria are associated with a function that is used for determining a weighting for the criteria. For example, a function corresponding to network latency may specify a weighting that increases at a decreasing rate as latency increases. (In other words, small changes in latency closer to zero latency may have a bigger effect on the weighting than small changes of latency that are already very high, such as 500 ms.)

In one embodiment, criteria may be mapped to other criteria in a manner similar to an exchange rate; for example, a scaling factor may be applied to each criteria that maps it to some perception of cost or user experience. Thus, by way of example and not limitation, temperature or bandwidth may be mapped to cost, level of processing power mapped to temperature, cost of power mapped to quality of user experience as determined from user feedback, a particular game or user mapped to a cost based on average expenditure of resources (e.g., computational, network, or energy resources) needed for operating a session of the game or with the user. In this way, a projected cost can be estimated. In certain cases, estimated costs may be determined only in so far as to provide an acceptable level or range of a particular criteria (for example, temperature range or minimum required bandwidth).

In some embodiments, initial scores are determined based on historical observation. For example, after the allocation algorithm pairs a client device with a data center and/or server of the data center, data from the particular session is collected and stored. This historical data then may be used for future decision making by training or refining the allocation algorithm. For example, in one embodiment, each criteria used for scoring may be weighted initially based on historical data, such as an expected cost for supporting the candidate user, or based on historical information from the user or other similar users. Further, in some embodiments, the criteria then may be weighted based on other conditions or considerations. By way of example and not limitation, whether it is particularly hotter at one data center (and thus the cost is expected to be greater), whether it is a holiday (and thus more users are expected), whether it is known that a particular data center (or server of a data center) will be undergoing maintenance, whether the game (or application) is a multi-player game and the locations of the other players are known. For example, for a multi-player game with a player in New York and a player in Seattle, it may be desirable to assign them to a server in Chicago, so that both will experience similar network latency levels.

In one embodiment, a score card is generated for each of the candidate data centers. The score card may include a single score for the data center or a set of scores for various criteria (such as scores for cost of power, average user experience rating, bandwidth, capacity, or the like). The score card may be received by assignment manager 680 and used for determining an assignment. In the case of a set of scores on the score card, assignment manager 680 may use a subset of the scores, in some instances. For example, in the case of a premium-subscription user, using the score card, the assignment manager may consider only the average user experience rating and assign the user to a data center with high average user-experience ratings. Score cards may be generated initially based on received criteria, including historical data, and may be updated during and following user sessions. For example, as historical criteria of user experience with a data center changes, a score card scoring user experience of the data center can be updated. In one embodiment, score cards are stored on storage 685.

In some embodiments, one or more scoring models are used for determining scores. In some case, models can correspond to various conditions and include a particular set of weighting coefficients to be applied to criteria. For example, one model may correspond to a release of a new game and include logic for weighting criteria that biases availability and bandwidth criteria for game servers supporting the newly released game. In some embodiments, the allocation algorithm comprises one or more learning models. Learning models may be determined based on historical information and updated or retrained based on data received from newly completed sessions. In one embodiment, a set of models is used, wherein the models compete with each other. For example, the models may be used to determine candidate scores representing the cost, user experience, or the like for potential matchings of data centers 641 to the client devices 610. Following the actual user session, data from the session is used to evaluate the candidate scores to determine an accuracy of the models. More accurate models may be given more weight for future determinations. In one embodiment, a Monte Carlo analysis may be performed with some of the criteria of the models, in order to generate more accurate models.

In one embodiment, the client device connects to the data center with the best score. In another embodiment, the data centers corresponding to the scores are ranked (or the candidate client-device-data-center matches corresponding to the scores are ranked) according to scores. In one embodiment, the client device first attempts to connect to the data center associated with the best score, and then the next best score, and so on, until the client device is finally connected.

In one embodiment, the allocation algorithm comprises a trading algorithm, wherein data centers bid for potential users. Each data center provides a bid similar to an RFQ. For example, using an exchange rate as described previously, a value may be determined to represent the cost for supporting a user, and a bid determined based on that cost. For example, if a particular user wants to play Halo, a data center may determine the cost to run a session for that user and submit a bid to assignment manager 680. Based on the received bids, the user's client device is assigned to the winning bidder. In one embodiment, upon requesting bids from the data centers, criteria related to the user, game, or client device may be provided to the data center and used for determining the bid (along with other criteria from the data center). In one embodiment, the initial communication from a user to the data center for soliciting a bid is used to assess network quality between the user and data center, from which network criteria can be determined.

By way of examples and not limitations, suppose the user is located near a data center in New York, which has criteria corresponding to a higher quality user experience (e.g., low latency, high bandwidth, etc.), but the data center is filling up with other users and therefore has decreasing capacity. That data center therefore has a higher cost to support an additional user, and thus may submit a higher bid (or lower bid, for a lowest-bid-wins model). The user therefore may end up connecting with a data center submitting a lower bid. For the same scenario where the user is a premium user, then in one embodiment, the weighing of the bids submitted by the New York datacenter may be altered to reflect a lower bid. Similarly, in another embodiment, bid-acceptance logic is applied such that the subscription level (or tier) of the user affects the bidding result. For example, bid-acceptance logic may result in the bid being discounted to a lower rate or giving the user more "money" (or credits) to spend for the bidding. (The user doesn't actually receive money but rather is capable of affording a higher bid.) The user is therefore able to accept the bid for the New York data center and receive the higher quality user experience. In one embodiment, wherein the client accepts bids, assignment manager 680 or bid logic, which may operate on the client device 610, determines a maximum bid which the client can accept, so that the client does not accept a bid it cannot afford. In one embodiment, the bid adjustment (whether by discount, increasing the user's bid-limit, or other means) is performed by a service on assignment manager 680 or one or more data centers, rather than on the client device 610 in order to prevent cheating by the client.

In another example, suppose requests for bids are received from two players in the same approximate location; one of the players wants to play Halo and the other player wants to play blackjack. Each of the available data centers may submit a bid. One of these data centers may bid very high for the Halo player because it is too far away and the user experience would likely be poor. That same data center may provide a lower bid for black jack because the black jack game can tolerate a higher latency, which may occur due to the greater distance of the data center from the black jack player. The user quality for black jack would still be acceptable.

In one embodiment, a bid comprises a set of scores; for example, a data center's bid may include a user-speed score (e.g., a number such as "1000" or "fast"), an operational-cost score representing the cost to support the user (e.g., "high" or a number such as "1000," if it costs more because the data center is located in the south and it's hotter or power is more expensive at this location), a capacity score (based on availability or projected availability), a user-experience score (based on past user feedback, for example), and the like. Based on the particular needs of the user, a winning bidder is determined. For example, where the user is a premium subscriber, operational costs may be ignored, but a user-speed score may be relied on to determine the winning bidder. Similarly, for a user playing Halo or a game with low tolerance for latency, user speed may be more important than other parts of the bid.

In one embodiment, assignment manager 680 functions like a clearing house or broker for the bidding transactions. In another embodiment, the bidding takes place between the data centers and the client devices. Assignment manager 680 may only host the market place for bidding, may monitor the bids, determine data centers eligible to bid, or perform similar roles, in some embodiments. In particular, assignment manager 680 may provide the locations of the data centers 641, 642, and 645 to a particular client device 610. Client device 610 then communicates with the data centers to solicit bids based on the game the user of the client device desires to play. Each data center is unaware of what other data centers may be bidding. The client device connects with the winning bidder. In one embodiment, the initial communication with the data centers to solicit bids provides information for determining network criteria, which may alter the bids.

One advantage of moving the decision process to the client device (by having the client device solicit bids and connect with the winning bidder) is that it distributes the analysis onto the client devices. In particular, the quantity of data coming in from all of the data centers and players from all over the world is such that it may be difficult to perform a real-time analysis at the assignment manager. Thus, although assignment manager 680 is shown as a separate component in FIG. 6, in some embodiments, assignment manager 680 or some of the functions performed by manager 680 may be performed by client device 610 or a data center 641.

Some embodiments of the invention also facilitate dynamically balancing loads on the data centers and servers by reallocating or reassigning users during application usage (such as moving a player during game play) to a different server or data center based on the newly determined criteria. For example, in one embodiment, user allocation may be periodically evaluated to determine if reassignment is needed. If reassignment of the client device is needed, then a client device may be transferred to another data center (or server within a data center) at a time that minimizes disruption of the game or degrading the user experience. For example, the client device may be transferred when the player is between levels, rounds, or scenes of a game; as the next level, round, or scene is loading; or during moments of the game with higher tolerance for latency, when the player is listening to dialog and not playing, or similar times.

In one embodiment, the assignment manager 680 polls data centers at intervals to determine if a transfer is needed. Alternatively, in one embodiment, a data center provides an indication to assignment manager 680 that a transfer is needed. In some cases, the data center also provides one or more candidate client devices for transferring. Or in some embodiments, assignment manager 680 determines a client device to be transferred based on one or more criteria. For example, a client device may be determined to be transferred based on lowest cost to support the user or other users, or a client device of a non-subscribing user (i.e., a free user) may be determined to be transferred over a subscribing user. As a second example, a client device may be determined to be transferred to be on the same server as client devices of other players in the same multi-player game, or may be transferred to free up space on the data center for other users expected to log on to play.

Figure 7:
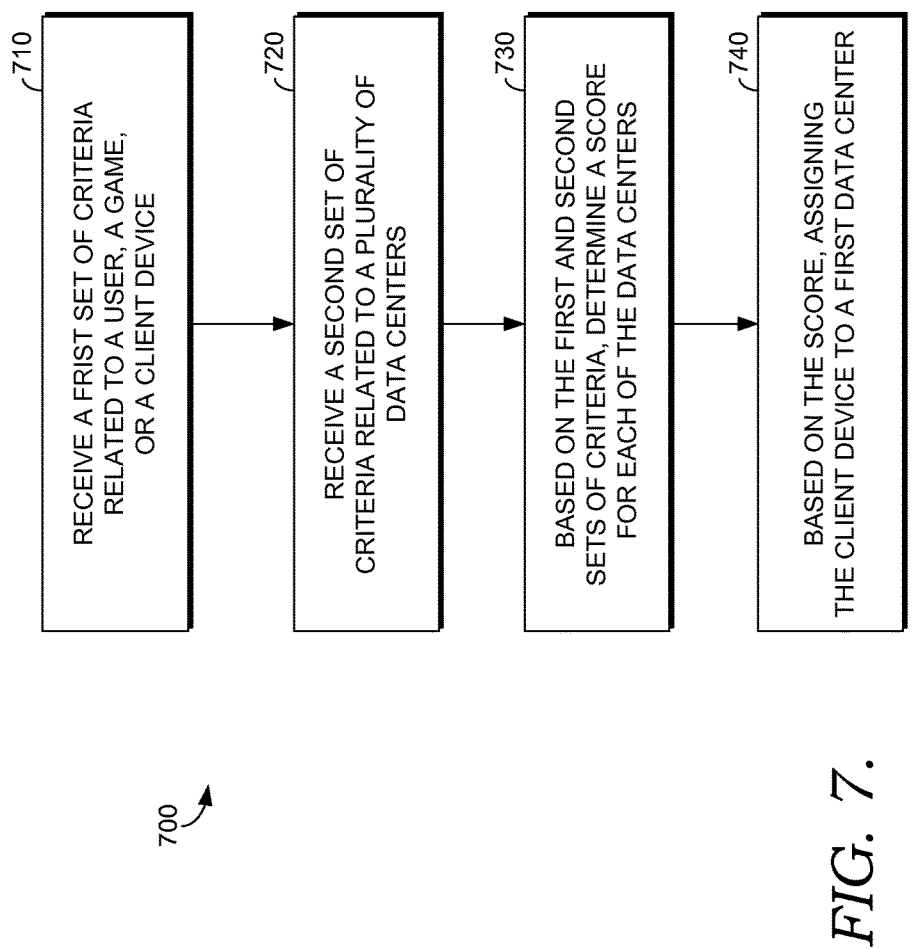
FIG. 7 is a flow chart showing a method of assigning a client device to a data center, in accordance with an embodiment of the present invention.

Turning now to FIG. 7, a method 700 of assigning a client device to a data center is provided, in accordance with an embodiment of the present invention. The client device and data center may be similar to client devices and data centers described previously. The data center supports an application or gaming session with the client device. In one embodiment, method 700 may be performed by the client device, a data center, or an assignment manager, such as assignment manager 680 described in connection to FIG. 6.

At step 710, a first set of criteria is received. The first set of criteria is related to at least one of a user, a game (or application) that the user desires to play, and the client device. Examples of the criteria related to users, games, and client devices were described previously in connection to FIG. 6. In one embodiment, the first set of criteria includes historical information, such as average user-session times. In one embodiment, the first set of criteria also includes network-related criteria, such as latency levels and bandwidth of the network that the client device communicates over. In one embodiment, the first set of criteria is received by an assignment manager or other component that performs a function of assigning the client device to a data center. In another embodiment, the first set of criteria is received by a data center or the client device.

At a step 720, a second set of criteria are received. The second set of criteria is related to a plurality of data centers. In one embodiment, each data center provides a subset of criteria of the second set of criteria. The criteria provided by each data center includes criteria related to the data center, such as described previously in connection to FIG. 6. In one embodiment, each subset of criteria also includes network-related criteria, such as latency levels and bandwidth of the network that the particular data center communicates over. In one embodiment, the second set of criteria is received by an assignment manager or other component that performs a function of assigning the client device to a data center. In another embodiment, the second set of criteria is received by one of the data centers or the client device.

At a step 730, based on the first and second sets of criteria, a score is determined for each data center. In one embodiment, the score may be determined by a scoring component, such as described in connection to FIG. 6. In one embodiment, scores are determined for each data center and correspond to a potential matching between the data center and the client device. (In other words, the scores are specific to the data center and client device.) In one embodiment, scores are determined for each data center based on the subset of criteria for that data center and the first set of criteria. For example, where the first set of criteria includes information about a game indicating that the game has low tolerance for latency and the user is a premium user, and a subset of criteria for a data center indicates that the data center has poor bandwidth, limited capacity, and is located far from the user, then that particular data center may receive a lower score. In some embodiments, scores for the data centers are determined as described in connection to FIG. 6.

At step 740, based on the scores determined for each data center, the client device is assigned to a first data center. In one embodiment, the client device is assigned to the data center with the best score, which may be the data center with the highest or lowest score, depending on how the scores are calculated. For example, wherein a high score corresponds to a high cost for supporting the client device at a given quality of user experience, then the client device may be assigned to the lowest score that maintains the given quality of user experience. In one embodiment, the client device is provided a ranking of scores such that the client device can attempt to connect with the best scoring data center, and if that fails, then the next best, and so on. In one embodiment, an assignment manager or an allocation component assigns the client device to a particular data center, based on the scores.

Figure 8:
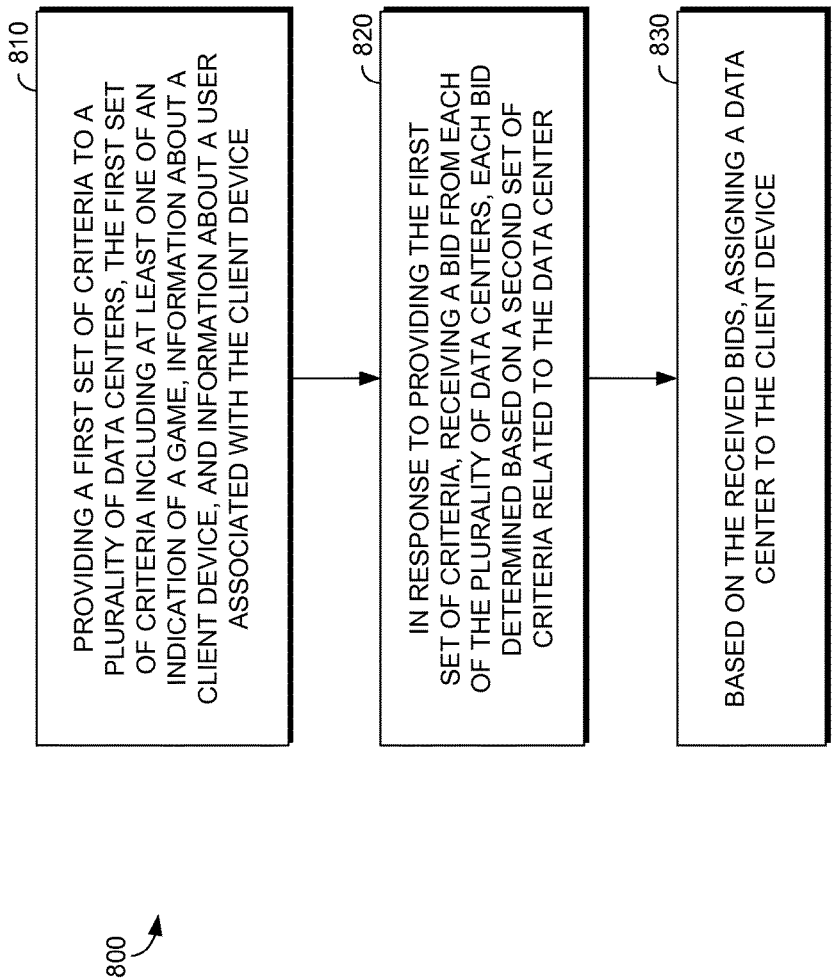
FIG. 8 is a flow chart showing a method of assigning a client device to a data center, in accordance with an embodiment of the present invention.

With reference now to FIG. 8, a method 800 of assigning a client device to a data center is provided, in accordance with an embodiment of the present invention. Embodiments of method 800 determine an assignment based on bids received from or corresponding to potential data centers that a client device may be assigned. The client device and data center may be similar to client devices and data centers described previously. The data center supports an application or gaming session with the client device. In one embodiment, method 800 may be performed by the client device, a data center, or an assignment manager, such as assignment manager 680 described in connection to FIG. 6.

At step 810, a first set of criteria is provided to a plurality of data centers. In one embodiment, the first set of criteria includes at least one of an indication of a game (or application) that a user desires to play (or use), information about a client device, such as a gaming device, and information about a user associated with the client device, such as a player of the game. In one embodiment, the first set of criteria comprises criteria related to a user, a game, or a client device, such as described previously in connection to FIG. 6. The first set of criteria may be provided over a network. In one embodiment, the plurality of data centers is determined based on a set or list of potentially available data centers, which may be located at the client device or at another component, such as an assignment manager.

At step 820, in response to providing the first set of criteria, a bid is received from each data center of the plurality of data centers, and may be received over a network by the client device, an assignment manager, or another component. Each bid corresponds to a score associated with the data center, such as described previously in connection to FIG. 6, which may be determined based on criteria related to the data center, user, game, and/or client device. Each bid for a particular data center is determined at least in part based on a second set of criteria related to that data center and may also be determined based on the first set of criteria provided to the data center. In one embodiment, the second set of criteria comprises criteria related to a data center, such as previously described in connection to FIG. 6. In one embodiment, the bids correspond to an estimated cost for operating the client device by the data center, based on the first and second criteria.

At step 830, based on the received bids, a data center is assigned to the client device. In some cases, the assignment also includes assigning a server within the data center to the client device. In one embodiment, the data center with the best bid is assigned to the client device. The data center with the best bid may be the data center with the highest or lowest bid, depending on how the bids are calculated, or may represent a set of scores, such as described in connection to FIG. 6. In one embodiment, the assignment of step 830 occurs by the client device connecting to the data center with the best bid. In another embodiment, an assignment manager or allocation component assigns the client device to the data center with the best bid. Examples of assigning client devices to data centers based on bidding are described in connection to FIG. 6.

Figure 9:
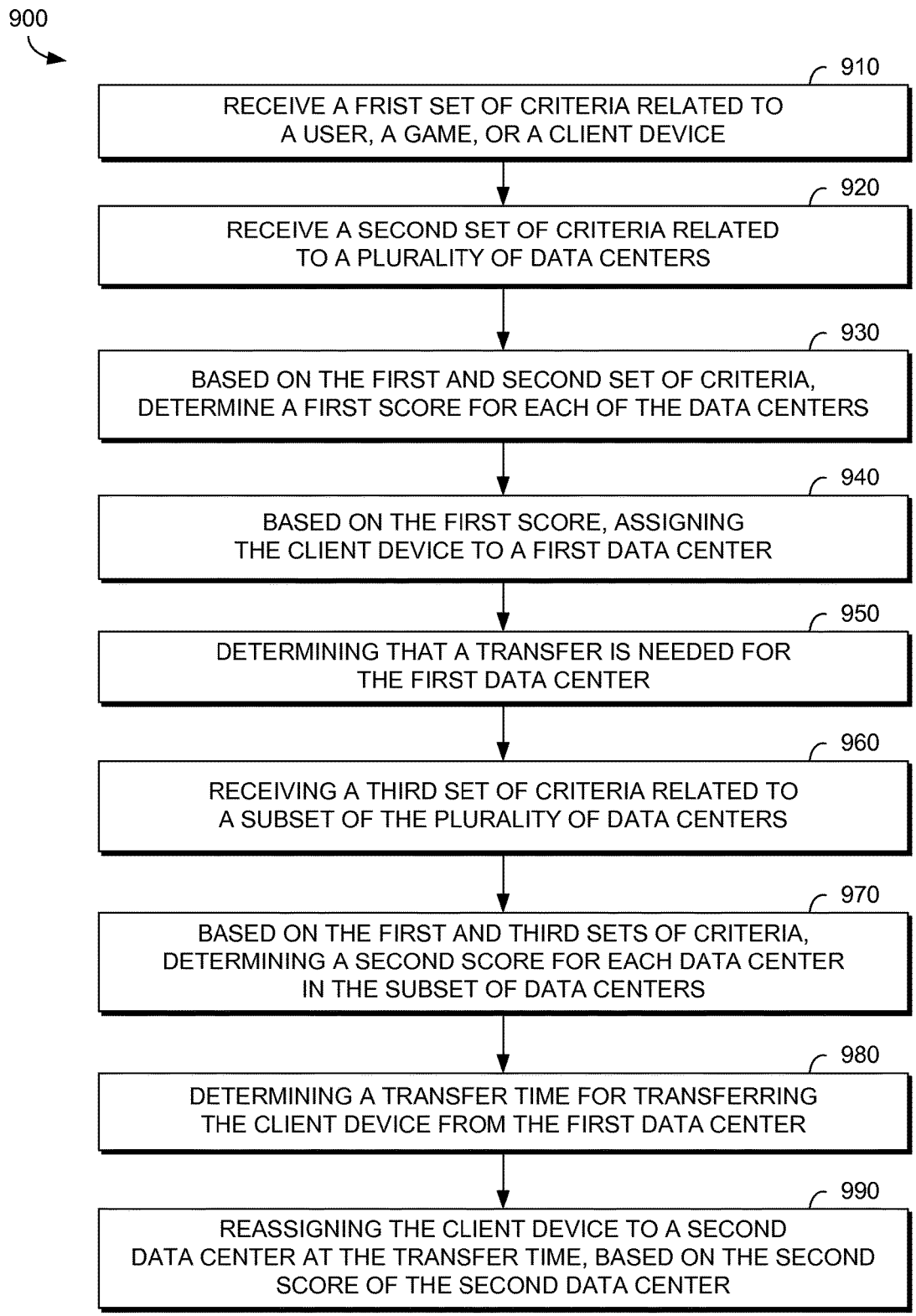
FIG. 9 is a flow chart showing a method of reassigning a client device to a data center, in accordance with an embodiment of the present invention.

Turning now to FIG. 9, a method 900 of reassigning a client device to a data center is provided, in accordance with an embodiment of the present invention. Embodiments of steps 910, 920, 930, and 940 are similar to steps 710, 720, 730, and 740 of method 700, described in connection to FIG. 7. In these steps, a client device is initially assigned to a data center. It is contemplated that some embodiments of method 900 include only the steps related to reassigning or transferring a client device to another data center, such as steps 950 through 990.

Accordingly, at step 950, method 900 determines that a transfer is needed for the first data center. In one embodiment, the first data center notifies an assignment manager or a client device that it needs to offload the client device (or a plurality of client devices). The first data center may determine the need to have one or more of its connected client devices reassigned based on criteria related to the data center. For example, the data center is filling up, projects an increase in high-workload users, will be undergoing maintenance, etc. In some embodiments, the data center further determines candidate connected-client-devices for transferring to another data center, and may provide this to an assignment manager.

At step 960, a third set of criteria are received. The third set of criteria is related to a subset of the plurality of data centers. For example, in one embodiment, the third set of criteria includes criteria related to available data centers except the first data center. In one embodiment, the third set of criteria includes criteria related to one or more data centers available and/or capable for receiving a transferred client device, which may be specified in the third set of criteria. In one embodiment, the third set of criteria are similar to the second set of criteria, as described in connection to step 920, except that the criteria are related to only a subset of the data centers.

At step 970, based on the first and third sets of criteria, a score is determined for each data center in the subset of data centers. In one embodiment, the score may be determined by a scoring component, such as described in connection to FIG. 6. In one embodiment, step 970 is similar to step 730 of method 700 (FIG. 7).

At step 980, a transfer time is determined for transferring the client device from the first data center. As described previously in connection to FIG. 6, a client device may be transferred to another data center (or server within a data center) at a time that minimizes disruption of the game or degrading the user experience. For example, the client device may be transferred when the player is between levels, rounds, or scenes of a game; as the next level, round, or scene is loading; or during moments of the game with higher tolerance for latency, when the player is listening to dialog and not playing, or similar times. In one embodiment, an analysis is performed of the current session with the client device. Based on the analysis, one or more future time intervals likely to satisfy the constraints for transferring (i.e., minimizes disruption of the game) is identified. For example, it may be determined that the user is approaching a scene change in the game or that a round will be ending soon, and therefore a suitable time for transferring is forthcoming.

At step 990, the client device is reassigned to a second data center at the transfer time. In one embodiment, the second data center is determined from the second scores for each subset of data centers determined in step 970. For example, the second data center is determined as the data center with the best second score. Then at the transfer time, the client device is transferred (or reassigned) to the second data center, thereby freeing up resources of the first data center.

Various embodiments of the invention which relate to determining a score associated with a data center may be used as a decision maker for many situation. The situations described above are only examples, and it is contemplated that embodiments can include application of the scores for other purposes. For example, in one embodiment, data center scores are used for providing feedback into a content management system, which may be used for affecting the distribution of content to the scored data centers. Additional examples of applications for the scores include the decision of where to build new data centers and data center management decisions, such as maintenance and upgrades. In another example, the scores may be used for facilitating derailing of a user. In particular, if a user is connecting and the cost for the user, at that time, is too high, then the user may be derailed, such as by offering the user a real time promotion that changes the behavior of the user so that the user does not try to connect at that time. For example, the user may be offered a free movie or a game demo for another game, if they choose to watch or play it right then. The derailment function may be based on calculating a real time value of how much we want the customer right now.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more computer-storage media having computer-executable instructions embodied thereon that, when executed by a computing device, perform a method of assigning a client device to a data center, the method comprising:
   receiving a first set of criteria related to a user, a game, or a client device;
   receiving a second set of criteria related to a plurality of data centers;
   based on the first and second sets of criteria, determining a score for each of the data centers in the plurality of data centers, thereby forming a set of scores for the plurality of data centers, the set of scores corresponding to the client device, wherein the score for a respective data center represents a quality of a given user experience for a particular client device matched to the respective data center, and wherein the score for the respective data center is based on criteria including at least user-provided feedback from previous sessions with the respective data center;
   providing a ranked listing of scores to rank each of the data centers based on the set of scores corresponding to the client device; and
   based on the ranked listing of the scores to rank each of the data centers, assigning the client device to a first data center.

2. The media of claim 1, further comprising assigning the client device to a first server in the first data center.

3. The media of claim 1, wherein the client device is assigned to the data center having a best score.

4. The media of claim 1, wherein a score for each of the data centers corresponds to a cost for each data center of operating the client device for a session.

5. The media of claim 1, wherein the first set of criteria includes at least one criterion of the group comprising: the user's subscription level, average session time for the user, geographic location of the client device, network conditions associated with the client device, title of a game the user desires to play, minimum bandwidth requirements for the game, and maximum latency or minimum fps tolerated by the game; and wherein the second set of criteria includes at least one criterion of the group comprising: temperature and cooling distribution, power or energy usage, cost of energy, power distribution, server utilization, content distribution, geographic location of the data center, scheduled maintenance downtime, capacity, available gaming content, projected cost for operating a user, and average quality of user experience associated with the data center.

6. The media of claim 1, wherein an allocation algorithm is used to determine the scores, and further comprising:
   monitoring a session initiated by the client device and the first data center after the client device is assigned to the first data center;
   receiving data based on the monitored session; and
   updating the allocation algorithm based on the received data.

7. The media of claim 5, wherein the average quality of user experience is determined from feedback provided by past users of each data center.

8. The media of claim 6, wherein the second set of criteria includes historical, current, and projected levels of criteria.

9. A method of assigning a client device to a data center, the method comprising:
   receiving a first set of criteria related to a user, a game, or a client device;
   receiving a second set of criteria related to a plurality of data centers;
   based on the first and second sets of criteria, determining a score for each of the data centers in the plurality of data centers, thereby forming a set of scores for the plurality of data centers, the set of scores corresponding to the client device, wherein the score for a respective data center represents a quality of a given user experience for a particular client device matched to the respective data center, and wherein the score for the respective data center is based on criteria including at least user-provided feedback from previous sessions with the respective data center;
   providing a ranked listing of scores to rank each of the data centers based on the set of scores corresponding to the client device; and
   based on the ranked listing of the scores to rank each of the data centers, assigning the client device to a first data center.

10. The method of claim 1, further comprising assigning the client device to a first server in the first data center.

11. The method of claim 1, wherein the client device is assigned to the data center having a best score.

12. The method of claim 1, wherein a score for each of the data centers corresponds to a cost for each data center of operating the client device for a session.

13. The method of claim 1, wherein the first set of criteria includes at least one criterion of the group comprising: the user's subscription level, average session time for the user, geographic location of the client device, network conditions associated with the client device, title of a game the user desires to play, minimum bandwidth requirements for the game, and maximum latency or minimum fps tolerated by the game; and wherein the second set of criteria includes at least one criterion of the group comprising: temperature and cooling distribution, power or energy usage, cost of energy, power distribution, server utilization, content distribution, geographic location of the data center, scheduled maintenance downtime, capacity, available gaming content, projected cost for operating a user, and average quality of user experience associated with the data center.

14. The method of claim 1, wherein an allocation algorithm is used to determine the scores, and further comprising:
   monitoring a session initiated by the client device and the first data center after the client device is assigned to the first data center;
   receiving data based on the monitored session; and
   updating the allocation algorithm based on the received data.

15. The method of claim 14, wherein the average quality of user experience is determined from feedback provided by past users of each data center.

16. The method of claim 14, wherein the second set of criteria includes historical, current, and projected levels of criteria.

17. One or more computer-storage media having computer-executable instructions embodied thereon that, when executed by a computing device, perform a method of assigning a gaming client device to a data center, the method comprising:
   receiving a first set of criteria related to a user, a game, or the gaming client device;
   receiving a second set of criteria related to a plurality of data centers;
   based on the first and second sets of criteria, determining a score for each of the data centers in the plurality of data centers, thereby forming a set of scores for the plurality of data centers, the set of scores corresponding to the gaming client device, wherein the score for a respective data center represents a quality of a given user experience for a particular gaming client device matched to the respective data center, and wherein the score for the respective data center is based on criteria including at least user-provided feedback from previous sessions with the respective data center;
   providing a ranked listing of scores to rank each of the data centers based on the set of scores corresponding to the gaming client device; and
   based on the ranked listing of the scores to rank each of the data centers, assigning the gaming client device to a first data center.

18. The media of claim 17, further comprising assigning the gaming client device to a first server in the first data center.

19. The media of claim 17, wherein the gaming client device is assigned to the data center having a best score.

20. The media of claim 17, wherein a score for each of the data centers corresponds to a cost for each data center of operating the gaming client device for a session.

* * * * *